(12) United States Patent
Shao et al.

(10) Patent No.: US 12,247,707 B2
(45) Date of Patent: Mar. 11, 2025

(54) METHOD AND SYSTEM FOR SAFETY MONITORING OF GAS FACILITIES IN A COMPREHENSIVE PIPELINE GALLERY BASED ON THE INTERNET OF THINGS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Lilong Su, Chengdu (CN); Junyan Zhou, Chengdu (CN); Siwei Zeng, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/670,695

(22) Filed: May 21, 2024

(65) Prior Publication Data
US 2024/0310007 A1    Sep. 19, 2024

(30) Foreign Application Priority Data
Mar. 25, 2024  (CN) ......................... 202410338821.X

(51) Int. Cl.
*F17D 5/00* (2006.01)
*F17D 5/02* (2006.01)
(Continued)

(52) U.S. Cl.
CPC ......... *F17D 5/005* (2013.01); *G06Q 10/0635* (2013.01); *G06Q 50/06* (2013.01);
(Continued)

(58) Field of Classification Search
CPC ........ G06Q 50/06; G06Q 10/20; G06Q 50/26; G06Q 10/0635; G06Q 10/063;
(Continued)

(56) References Cited

U.S. PATENT DOCUMENTS

2019/0346338 A1* 11/2019 Meyer .................... G06F 17/18
2020/0111062 A1*  4/2020 Yoshikawa ........ G06Q 10/0635
(Continued)

FOREIGN PATENT DOCUMENTS

CN        110309620 A       10/2019
CN        113256160 A  *     8/2021
(Continued)

OTHER PUBLICATIONS

First Office Action in Chinese Application No. 202410338821.X mailed on May 31, 2024, 12 pages.
(Continued)

*Primary Examiner* — Yoshihisa Ishizuka
*Assistant Examiner* — Carter W Ferrell
(74) *Attorney, Agent, or Firm* — METIS IP LLC

(57) ABSTRACT

The present disclosure provides a method and a system for safety monitoring of gas facilities in a comprehensive pipeline gallery based on IoT, the method includes: obtaining first monitoring data of a gas cabin and second monitoring data of other cabins from at least one monitoring position combination; determining a joint risk of the one or more first monitoring positions based on the first monitoring data and the second monitoring data; determining a maintenance parameter and/or adjusting at least one monitoring parameter based on the joint risk; generating at least one adjustment instruction based on adjustment amount of the monitoring parameter, determining an adjustment priority of the at least one monitoring parameter based on a data uploading (Continued)

intensity of the gas cabin, sending the at least one adjustment instruction to the corresponding one or more first monitoring positions based on the adjustment priority sequentially.

5 Claims, 3 Drawing Sheets

(51) Int. Cl.
    *G06Q 10/0635*     (2023.01)
    *G06Q 50/06*     (2024.01)
    *G16Y 10/35*     (2020.01)
    *G16Y 40/10*     (2020.01)
    *G16Y 40/50*     (2020.01)

(52) U.S. Cl.
    CPC .............. *G16Y 10/35* (2020.01); *G16Y 40/10* (2020.01); *G16Y 40/50* (2020.01); *F17D 5/02* (2013.01)

(58) Field of Classification Search
    CPC ........ G16Y 10/35; G16Y 40/10; G16Y 20/10; G16Y 40/35; G16Y 40/50; F17D 5/005; F17D 5/02; F17D 3/01; G08B 21/16; G08B 19/0428; H04L 67/12
    See application file for complete search history.

(56) References Cited

U.S. PATENT DOCUMENTS

| | | | |
|---|---|---|---|
| 2020/0191316 A1* | 6/2020 | Du | G06Q 10/0635 |
| 2022/0057367 A1* | 2/2022 | Claudio | G06N 5/01 |
| 2023/0368632 A1 | 11/2023 | Shao et al. | |
| 2023/0400309 A1 | 12/2023 | Shao et al. | |

FOREIGN PATENT DOCUMENTS

| | | | |
|---|---|---|---|
| CN | 110197329 B | | 10/2021 |
| CN | 113642901 A | * | 11/2021 |
| CN | 115375201 A | * | 11/2022 |
| CN | 117611414 A | | 2/2024 |

OTHER PUBLICATIONS

Notification to Grant Patent Right for Invention in Chinese Application No. 202410338821.X mailed on Jun. 12, 2024, 4 pages.

Shi, Youzhi et al., Intelligent Control of Ventilation and Dehumidification of Utility Tunnel Based on Internet of Things and GIS, Tunnel Construction, 40(8): 1133-1139, 2020.

Xu, Jian et al., Risk Analysis and Smart Safety Monitoring of Underground Municipal Water Pipe Gallery Project, 2021 7th International Conference on Hydraulic and Civil Engineering & Smart Water Conservancy and Intelligent Disaster Reduction Forum, 890-894, 2021.

* cited by examiner

200

```
┌─────────────────────────────────────────────────┐
│ Obtaining first monitoring data of a gas        │  210
│ compartment and second monitoring data of the   │
│ other compartments from at least one monitoring │
│ position combination                            │
└─────────────────────────────────────────────────┘
                        ↓
┌─────────────────────────────────────────────────┐
│ Determining a joint risk of the first monitoring│  220
│ position based on the first monitoring data and │
│ the second monitoring data                      │
└─────────────────────────────────────────────────┘
                        ↓
┌─────────────────────────────────────────────────┐
│ Determining a maintenance parameter and/or      │  230
│ adjusting a monitoring parameter, based on the  │
│ joint risk                                      │
└─────────────────────────────────────────────────┘
                        ↓
┌─────────────────────────────────────────────────┐
│ Generating an adjustment instruction based on   │
│ adjustment amount of the monitoring parameter,  │
│ determining an adjustment priority of the       │  240
│ monitoring parameter based on a data uploading  │
│ intensity of the gas compartment, and sending   │
│ the adjustment instruction sequentially to the  │
│ corresponding first monitoring position based   │
│ on the adjustment priority                      │
└─────────────────────────────────────────────────┘
```

FIG. 2

METHOD AND SYSTEM FOR SAFETY MONITORING OF GAS FACILITIES IN A COMPREHENSIVE PIPELINE GALLERY BASED ON THE INTERNET OF THINGS

CROSS REFERENCE TO RELATED APPLICATIONS

This application claims priority to Chinese Patent Application No. 202410338821.X filed on Mar. 25, 2024, the entire contents of which are incorporated herein by reference.

TECHNICAL FIELD

The present disclosure relates to a field of comprehensive pipeline gallery gas facilities monitoring, and in particular relates to methods and systems for safety monitoring of gas facilities in a comprehensive pipeline gallery based on Internet of Things.

BACKGROUND

A comprehensive pipeline gallery refers to public tunnels that centralize municipal pipelines such as electricity, drainage, heat underneath cities, etc. A comprehensive pipeline gallery design specification requires that when gas pipelines are incorporated into the comprehensive pipeline gallery, they cannot be built together with other cabins (e.g., a water supply cabin, a power supply cabin, etc.), and orifices of the gas pipelines cannot be connected with other cabins, at the same time, distances between a gas cabin and neighboring buildings may comply with the design specification, and the requirements above are all aimed at ensuring safety operation of the gas pipeline. However, different types of cabins may still be interacted with each other. For example, the gas cabins may be impacted when there is flooding, fire, or explosions in other modes. Therefore, a risk monitoring on the comprehensive pipeline gallery is required to ensure the safety of the gas pipelines.

Aiming at a problem of how to carry out the risk monitoring on the comprehensive pipeline gallery, CN110197329B proposes a method for state assessment of urban underground comprehensive pipelines. In the method, a state comprehensive score of the comprehensive pipeline gallery is calculated based on a possibility of danger occurring in the comprehensive pipelines and an impact degree after the danger occurs, so as to realize the state assessment of the comprehensive pipeline gallery. However, when assessing the state of the comprehensive pipeline gallery, the method lacks the corresponding technical means to monitor state data of different locations in the comprehensive pipeline gallery, which leads to an inability to ensure the safety of the operation of gas facilities.

Therefore, it is desired to provide a method and a system for safety monitoring of gas facilities in a comprehensive pipeline gallery based on Internet of Things to comprehensively take into account the risks posed by the state of other pipelines to the gas pipeline gallery, resulting in realizing an overhauling, a monitoring and a management of the gas pipeline gallery.

SUMMARY

One of the embodiments of the present disclosure provides a method for safety monitoring of gas facilities in a comprehensive pipeline gallery based on Internet of Things (IoT). The method may be implemented by a smart gas device management platform of a system for safety monitoring of gas facilities in the comprehensive pipeline gallery based on the IoT. The method may include: obtaining first monitoring data of a gas cabin and second monitoring data of other cabins, from at least one monitoring position combination. The monitoring position combination may include one or more first monitoring positions in the gas cabin and one or more second monitoring positions in the other cabins. The at least one monitoring position combination may be determined based on a pipeline gallery distribution feature of at least one pipeline gallery sub-region. The method may further include determining a joint risk of the one or more first monitoring positions based on the first monitoring data and the second monitoring data; determining a maintenance parameter and/or adjusting at least one monitoring parameter based on the joint risk; and, generating at least one adjustment instruction based on an adjustment amount of the monitoring parameter, determining an adjustment priority of the at least one monitoring parameter based on a data uploading intensity of the gas cabin, and sending the at least one adjustment instruction to the corresponding first monitoring position based on the adjustment priority sequentially. The data uploading intensity may be determined based on the bandwidth utilization rate of the gas cabin.

One of the embodiments of the present disclosure provides a system for safety monitoring of gas facilities in a comprehensive pipeline gallery based on IoT. The system may include a smart gas user platform, a smart gas service platform, a smart gas device management platform, a smart gas sensor network platform, and a smart gas object platform. The smart gas device management platform may be configured to: obtain first monitoring data of a gas cabin and second monitoring data of other cabins from at least one monitoring position combination. The monitoring position combination may include one or more first monitoring positions in the gas cabin and one or more second monitoring positions in the other cabins, and the at least one monitoring position combination may be determined based on a pipeline gallery distribution feature of at least one pipeline gallery sub-region. The system may be further configured to determine a joint risk of the one or more first monitoring positions based on the first monitoring data and the second monitoring data; determine a maintenance parameter and/or adjusting at least one monitoring parameter based on the joint risk; and, generate at least one adjustment instruction based on an adjustment amount of the monitoring parameter, determine an adjustment priority of the at least one monitoring parameter based on the data uploading intensity of the gas cabin, and send the at least one adjustment instruction to corresponding the first monitoring position based on the adjustment priority sequentially. The data uploading intensity may be determined based on a bandwidth utilization rate of the gas cabin.

One of the embodiments of the present disclosure provides a computer-readable storage medium, the storage medium storing computer instructions. When reading the computer instructions in the storage medium, a computer may implement the foregoing method for safety monitoring of gas facilities in a comprehensive pipeline gallery based on IoT.

BRIEF DESCRIPTION OF THE DRAWINGS

FIG. 2 is a flowchart illustrating an exemplary process for safety monitoring of gas facilities in a comprehensive pipeline gallery based on IoT according to some embodiments of the present disclosure.

DETAILED DESCRIPTION

The drawings used in describing the embodiments are briefly introduced below. The drawings do not represent all embodiments.

It may be understood that the terms "system," "device," "unit," or "module," herein are used to distinguish different components, elements, parts, sections, or assemblies of different levels. However, the terms may be displaced by other expressions if they may achieve the same purpose.

The singular forms "a," "an," and "the," may be intended to include the plural forms as well, unless the context clearly indicates otherwise. Generally, the terms "include" and/or "comprise," when used in the present disclosure, specify the presence of stated steps and elements, but do not exclude the presence or addition of one or more other steps and elements thereof. The method or device may further include other steps or elements.

at a problem of how to carry out the risk monitoring on the comprehensive pipeline gallery, CN110197329B proposes a method for state assessment of urban underground comprehensive pipelines. In the method, a state comprehensive score of the comprehensive pipeline gallery is calculated based on a possibility of danger occurring in the comprehensive pipelines and an impact degree after the danger occurs, so as to realize the state assessment of the comprehensive pipeline gallery. However, when assessing the state of the comprehensive pipeline gallery, the method lacks the corresponding technical means to monitor state data of different locations in the comprehensive pipeline gallery, which leads to an inability to ensure the safety of the operation of gas facilities.

In view of the foregoing, some embodiments of the present disclosure provide a method and a system for safety monitoring of gas facilities in a comprehensive pipeline gallery based on Internet of Things (IoT). The method and the system utilize a monitoring device to obtain monitoring data of monitoring positions within a gas cabin and other cabins, and determine a risk of each monitoring position within the gas cabin based on the monitoring data. The method may further determine a maintenance parameter of each monitoring position and adjusting at least one monitoring parameter of each monitoring position based on the risk of each monitoring position in the gas cabin, comprehensively consider the risk of the state of the other pipelines on the gas pipeline gallery, so as to realize the maintenance, the monitoring and the management of the gas pipeline gallery.

Figure 1:
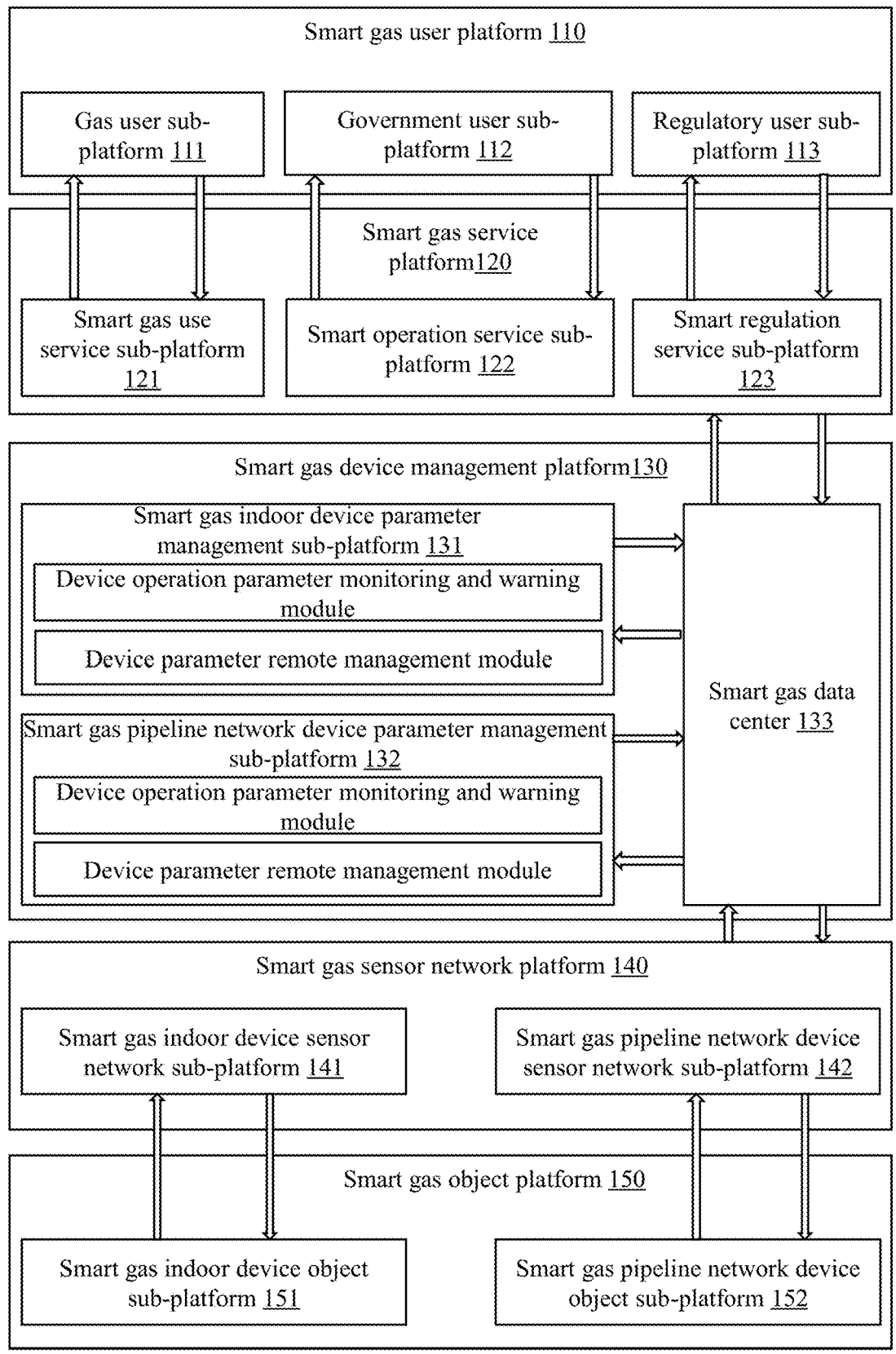
FIG. 1 is a schematic diagram illustrating an exemplary platform structure for a system for safety monitoring of gas facilities in a comprehensive pipeline gallery based on Internet of Things (IoT) according to some embodiments of the present disclosure.

FIG. 1 is a schematic diagram illustrating an exemplary platform structure for a system for safety monitoring of gas facilities in a comprehensive pipeline gallery based on IoT according to some embodiments of the present disclosure. It may be noted that the following embodiments are only used to explain the present disclosure and do not constitute a limitation of the present disclosure.

In some embodiments, as shown in FIG. 1, a system 100 for safety monitoring of gas facilities in a comprehensive pipeline gallery based on the IoT (also be referred to the system 100) may include a smart gas user platform 110, a smart gas service platform 120, a smart gas device management platform 130, a smart gas sensor network platform 140, and a smart gas object platform 150 connected in sequence.

The smart gas user platform 110 may be a platform for interacting with a user. In some embodiments, the smart gas user platform 110 may be configured as a terminal device. In some embodiments, the smart gas user platform 110 may include a gas user sub-platform 111, a government user sub-platform 112, and a regulatory user sub-platform 113.

The gas user sub-platform 111 may be a platform that provides a gas user with data related to a gas usage and solutions to gas problems. The gas user may be an industrial gas user, a commercial gas user, an ordinary gas user, etc. The government user sub-platform 112 may be a platform that provides data related to a gas operation for a government user. The government user may be an administrator of a gas operation entity, such as an administrator of an administrative department. The regulatory user sub-platform 113 may be a platform for a regulatory user to supervise the operation of the entire IoT system. The regulatory user may be a staff of a security management department.

In some embodiments, the smart gas user platform 110 may send a query instruction for gas device usage data to the smart gas device management platform 130 via the smart gas service platform 120, and receive a gas device management program (e.g., a maintenance parameter, a monitoring parameter, etc.) uploaded by the smart gas service platform 120.

The smart gas service platform 120 may be a platform for receiving and transmitting data and/or information. In some embodiments, the smart gas service platform 120 may receive the query instruction sent by the smart gas user platform 110 and send the query instruction down to the smart gas device management platform 130. In some embodiments, the smart gas service platform 120 may send a gas device management program to the smart gas user platform 110.

In some embodiments, the smart gas service platform 120 may include a smart gas use service sub-platform 121, a smart operation service sub-platform 122, and a smart regulation service sub-platform 123.

The smart gas use service sub-platform 121 may be a platform providing a gas use service for the gas user.

The smart operation service sub-platform 122 may be a platform that provides the government users with information related to the gas operation (e.g., a joint risk, the maintenance parameter, the monitoring parameter, etc. for each monitoring position in the gas pipeline gallery). The smart regulation service sub-platform 123 may be a platform providing a regulatory requirement for the regulatory user.

The smart gas device management platform 130 may be a platform that integrates and coordinates the linkage and collaboration between various functional platforms, aggregates all the information of the IoT, and provides perception management and control management functions for the IoT operation system.

In some embodiments, the smart gas device management platform 130 may include a smart gas indoor device parameter management sub-platform 131, a smart gas pipeline network device parameter management sub-platform 132, and a smart gas data center 133.

The smart gas indoor device parameter management sub-platform 131 and the smart gas pipeline network device parameter management sub-platform 132 may include a device operation parameter monitoring and warning module, and a device parameter remote management module, respectively. The device operation parameter monitoring and warning module may be configured to view historical data and real-time data of the device operation parameter and perform monitoring and warning according to a preset threshold. When the device operation parameter is abnormal (e.g., the device operation parameter exceeds a corresponding preset threshold), a management personnel may switch the device operation parameter monitoring and warning module to the device parameter remote management module directly, perform remote processing of the device parameter, and if necessary, initiate a reminding message to the user through the smart gas service platform 120. Through the device parameter remote management module, the device parameter of the smart gas object platform 150 may be remotely set and adjusted, and the device parameter adjustment initiated on-site by the smart gas object platform 150 may be remotely authorized.

In some embodiments, the smart gas pipeline network device parameter management sub-platform 132 may determine a joint risk of one or more first monitoring positions within a gas cabin based on relevant data (e.g., first monitoring data, second monitoring data, etc.) from the smart gas data center 133. In some embodiments, the smart gas pipeline network device parameter management sub-platform 132 may also be configured to further determine the maintenance parameter and/or adjust the at least one monitoring parameter. More descriptions of the related contents may be found in FIGS. 2-3 and the related descriptions.

The smart gas data center 133 may be configured to aggregate, store, and manage at least a portion of operation information of the system 100. In some embodiments, the smart gas data center 133 may be configured as a storage device for storing the first monitoring data and the second monitoring data of the gas cabin obtained from at least one monitoring position combination. In some embodiments, the smart gas device management platform 130 may perform information interactions respectively with the smart gas sensor network platform 140 and the smart gas object platform 150 via the smart gas data center 133. For example, the smart gas data center 133 may issue a query instruction for gas device usage data to the smart gas sensor network platform 140, and receive data related to the gas device uploaded by the smart gas sensor network platform 140. In some embodiments, the smart gas indoor device parameter management sub-platform 131, and the smart gas pipeline network device parameter management sub-platform 132 may bidirectional interact with the smart gas data center 133, respectively.

The smart gas sensor network platform 140 may be a functional platform for managing a sensor communication. In some embodiments, the smart gas sensor network platform 140 may achieve functions of perceptual information sensor communication and controlling information sensor communication, etc.

In some embodiments, the smart gas sensor network platform 140 may include a smart gas indoor device sensor network sub-platform 141, a smart gas pipeline network device sensor network sub-platform 142, which are configured to obtain operation information of the gas indoor device and the gas pipeline network device, respectively.

The smart gas object platform 150 may be a functional platform for perceptual information generation and controlling information execution. For example, the smart gas object platform 150 may monitor and obtain information about operations of the gas device (e.g., a gas self-closing valve).

In some embodiments, the smart gas object platform 150 may include a smart gas indoor device object sub-platform 151 and a smart gas pipeline network device object sub-platform 152. The smart gas indoor device object sub-platform 151 may be configured as various types of gas indoor devices for the gas user. The smart gas pipeline device object sub-platform 152 may be configured as various types of gas pipeline devices and monitoring devices.

In some embodiments, the smart gas pipeline network device object sub-platform 152 may obtain the first monitoring data of the gas cabin and the second monitoring data of the other cabins and transmit the monitoring data via the smart gas pipeline network device sensor network sub-platform 142 to the smart gas data center 133.

In some embodiments of the present disclosure, based on the system 100 for safety monitoring of a gas facility in a comprehensive pipeline gallery based on the IoT, a closed loop of information operation may be formed between the smart gas object platform and the smart gas user platform, and a coordination and regular operation may be implemented under a unified management of the smart gas management platform to achieve informationization and intelligence of the gas device management.

FIG. 2 is a flowchart illustrating an exemplary process for safety monitoring of gas facilities in a comprehensive pipeline gallery based on IoT according to some embodiments of the present disclosure. In some embodiments, a process 200 may be performed by the smart gas device management platform 130. As shown in FIG. 2, the process 200 may include the following operations.

In 210, first monitoring data of a gas cabin and second monitoring data of the other cabins from at least one monitoring position combination may be obtained.

The gas cabin refers to a closed channel in the comprehensive pipeline gallery for installing and laying gas pipelines and a gas device. The gas cabin may also include communication cables for transmitting monitoring data.

The other cabins refer to closed channels in the comprehensive pipeline gallery used for the installation and laying of other pipelines and other devices. For example, the other cabins may include a hydraulic cabin, a power cabin, a thermal cabin, etc. For example, the power cabin may be configured to lay power supply pipelines, the hydraulic cabin may be configured to lay water supply pipelines, and the thermal cabin may be used to lay heat pipelines, etc.

The above descriptions related to the gas cabin and the other cabins, are for illustrative purposes only, and are not intended to limit the scope of the present disclosure.

It may be noted that the gas cabin in the comprehensive pipeline gallery may be independent from the other cabins, i.e., architectural structures of the gas cabin and the other cabins may be separated from each other.

The first monitoring data refers to monitoring data collected in the gas cabin. The first monitoring data may include one or more of temperature, humidity, a water level, a smoke concentration, an oxygen concentration, and type and concentration of combustible gas (e.g., a methane gas leaking from a sewer line) in the gas cabin. The smart gas device management platform may obtain the first monitoring data through the monitoring device set at the at least one monitoring position within the gas cabin.

The second monitoring data refers to data collected at the other cabins. The second monitoring data may include one or more types of the temperature, the humidity, the water level, the smoke concentration, the oxygen concentration of the other cabins. The smart gas device management platform may obtain the second monitoring data through the monitoring device set at the at least one monitoring position in the other cabins.

The monitoring position combination refers to a combination of positions in different cabins used to set up monitoring devices. In some embodiments, the monitoring position combination may include one or more first monitoring positions in the gas cabin and one or more second monitoring positions in the other cabins. In some embodiments, the monitoring position combination may include monitoring positions of different cabins in the comprehensive gallery at a same preset roadway range. The roadway range refers to a longitudinal range of the roadway in which the comprehensive pipeline gallery is buried, the longitudinal direction is a direction in which the comprehensive pipeline gallery extends. The preset roadway range may be set according to actual needs. For example, assuming that the comprehensive pipeline gallery includes a hydraulic cabin, a power cabin, and a gas cabin, a monitoring position combination A may include a second monitoring position X1 in the hydraulic cabin located within a preset roadway range B, a second monitoring position X2 in the power cabin located within the preset roadway range B, and a first monitoring position X3 in the gas cabin located within the preset roadway range B.

In some embodiments, the monitoring device may include one or more of a temperature sensor, a humidity sensor, a smoke sensor, a water level sensor, an oxygen sensor, a combustible gas detector (e.g., a methane sensor, a natural gas sensor, etc.), etc.

In some embodiments, the at least one monitoring position combination may be determined based on a pipeline gallery distribution feature of at least one pipeline gallery sub-region.

The pipeline gallery sub-region refers to a portion of region divided from the comprehensive pipeline gallery. There may be a variety of division manners. For example, the comprehensive pipeline gallery may be divided according to a preset region size to obtain a plurality of pipeline gallery sub-regions. As another example, the comprehensive pipeline gallery may be divided according to administrative divisions of geographic positions of each cabin in the comprehensive pipeline gallery. In this way, and cabins belonging to the same administrative division may be divided as one pipeline gallery sub-region to obtain the plurality of pipeline gallery sub-regions.

The pipeline gallery distribution feature refers to the distribution feature of the comprehensive pipeline galleries contained in the pipeline gallery sub-regions. Different pipeline gallery sub-regions may correspond to different pipeline gallery distribution features. In some embodiments, the pipeline gallery distribution feature may include an arrangement and a direction of the comprehensive pipeline gallery contained in the pipeline gallery sub-regions, and a length and width of the portion of the comprehensive pipeline gallery corresponding to the pipeline gallery sub-region. The arrangement of the comprehensive pipeline gallery may include arrangement orders of different types of cabins. The direction of the comprehensive pipeline gallery refers to the direction of burial or extension of the comprehensive pipeline gallery. For example, the direction may be from south to north, etc.

In some embodiments, the smart gas device management platform may determine the pipeline gallery distribution feature of the at least one pipeline gallery sub-region based on engineering design drawings of the comprehensive pipeline gallery and the pipeline gallery sub-region.

The monitoring position combination may be determined in a variety of manners. In some embodiments, the smart gas device management platform may determine the monitoring position combination based on the pipeline gallery sub-region. In some embodiments, the smart gas device management platform may set one or more monitoring positions in each of the different cabins included in the pipeline gallery sub-region based on the arrangement of the comprehensive pipeline gallery in the pipeline gallery distribution feature, and obtain the monitoring position combination. For example, the arrangement of the comprehensive pipeline gallery in the pipeline gallery sub-region may be in an order of the power cabin, the hydraulic cabin and the gas cabin. A second monitoring position Q1 may be set in the power cabin, second monitoring positions Q2 and Q3 may be set in the hydraulic cabin, and a first monitoring position Q4 may be set in the gas cabin, which yields the monitoring position combination as (Q1, [Q2, Q3], Q4).

In some embodiments, the smart gas device management platform may determine a plurality of the monitoring position combinations based on one pipeline gallery sub-region. In some embodiments, the smart gas device management platform may set one or more monitoring positions at every first interval distance in each of the different cabins contained in the pipeline gallery sub-region to obtain a plurality of the monitoring position combinations based on the length and the arrangement of the comprehensive pipeline gallery in the pipeline gallery distribution feature. The monitoring positions in each of the cabins that are within the same preset roadway range may constitute the monitoring position combination. The first interval distance refers to a setup interval between different monitoring positions in the same cabin within the pipeline gallery sub-region. In some embodiments, the first interval distance may be a system preset value, a system default, etc.

In some embodiments, the smart gas device management platform 130 may determine the at least one monitoring position combination based on the pipeline gallery distribution feature, a high-risk region distribution, and a critical region distribution.

The high-risk region distribution refers to a feature associated with distribution of high-risk regions within the comprehensive pipeline gallery. In some embodiments, the high-risk region may include a construction region, a pump station region, a substation region, a vicinity of ventilation and cooling device, etc. In some embodiments, the high-risk region may also include a region with a history of occurrences or accidents. The high-risk region may be determined based on manual input. The high-risk region may be determined according to actual needs.

In some embodiments, the high-risk region distribution may include a location, an overhead shape, a sectional shape, a length, width, and height, an indoor region, a spatial volume, and other features of the high-risk region. The smart gas device management platform may determine the high-risk region distribution based on the engineering design drawings of the comprehensive pipeline gallery.

The critical region distribution refers to a feature associated with a distribution of regions to be focused on in the comprehensive pipeline gallery. In some embodiments, the critical region may include regions such as a device concentration region, an access intersection, a pipeline connection position, a diversion position, and other regions. The critical region may be determined based on manual setting. The critical region may be determined according to actual needs.

In some embodiments, the critical region distribution may include information such as a position, a top view shape, a sectional shape, a length, width, and height, an indoor region, and a spatial volume of the critical region. The smart gas device management platform may determine the critical region distribution based on the engineering design drawings of the comprehensive pipeline gallery.

In some embodiments, the smart gas device management platform may set one or more monitoring position combinations in each of the high-risk region and/or the critical region. In some embodiments, the smart gas device management platform may set one or more monitoring positions in different cabins contained in the high-risk region and/or the critical region, and obtain the monitoring position combination, based on the arrangement of the comprehensive pipeline galleries in the pipeline gallery distribution feature. In some embodiments, the smart gas device management platform may set one or more monitoring positions in each of the different cabins contained in the at the high-risk region and/or the critical region at a second interval distance based on the length and the arrangement of the comprehensive pipeline galleries in the pipeline gallery distribution feature, so as to obtain a plurality of the monitoring position combinations.

The second interval distance refers to an interval arranged between different monitoring positions in the same cabin contained in the high-risk region and/or the critical region. In some embodiments, the smart gas device management platform may determine the second interval distance based on an effective monitoring distance of the monitoring device. In some embodiments, the smart gas device management platform may determine the second interval distance to be less than or equal to the effective monitoring distance of the monitoring device. The effective monitoring distance of the monitoring device refers to a distance range at which the monitoring device obtains effective monitoring data. The effective monitoring distance of the monitoring device may be determined based on a performance and configuration of the monitoring device, or may be determined manually based on experience. More descriptions may be found in above d descriptions.

An unreasonable distribution of the monitoring positions may result in the critical region and the high-risk region being skipped over or not fully covered. In some embodiments of the present disclosure, determining the second interval distance based on a coverage region of the monitoring device may ensure that the critical region and the high-risk region are fully covered by monitoring.

In some embodiments, the smart gas device management platform may generate at least one candidate monitoring position set based on the pipeline gallery distribution feature, the high-risk region distribution, and the critical region distribution; calculate a regional coverage rate of the candidate monitoring position set; determine a target monitoring position set based on the regional coverage rate; and determine the at least one monitoring position combination based on the target monitoring position set.

The candidate monitoring position set refers to an initially determined monitoring position set. In some embodiments, a group of candidate monitoring position set may include monitoring positions of different cabins within different preset roadway ranges in the comprehensive pipeline gallery. For example, the comprehensive pipeline gallery may include a power cabin x, a hydraulic cabin y, and a gas cabin z, and the count of the preset roadway ranges may be three. A comprehensive pipeline gallery corresponding to a certain candidate monitoring position set may include: a second monitoring position X11 of the power cabin x within a preset roadway range 1, a second monitoring position (X21, X22) in a preset roadway range 2, and a second monitoring position (X31, X32, X33) in a preset roadway range 3; a second monitoring position Y11 of the hydraulics cabin y in a preset roadway range 1, a second monitoring position Y21 in a preset roadway range 2, and a second monitoring position (Y31, Y32) in a preset roadway range 3; a first monitoring position (Z11, Z12) of the gas cabin z in the preset roadway range 1, a first monitoring position (Z21, Z22) in the preset roadway range 2, and a first detection position Z31 in the preset roadway range 3.

The candidate monitoring position set may be generated in a variety of manners. In some embodiments, the smart gas device management platform may randomly generate a plurality of candidate monitoring position sets. In some embodiments, the smart gas device management platform may set one or more monitoring positions at different cabins contained in the at least one of the high-risk region and/or the critical region based on the arrangement of the comprehensive pipeline galleries in the pipeline gallery distribution feature to obtain a group of initial monitoring position set. In some embodiments, the smart gas device management platform may adjust the one or more monitoring positions in the initial monitoring position set for a plurality of times to generate the plurality of groups of candidate monitoring position sets. In some embodiments, the adjustments may include, but are not limited to, deleting the monitoring positions, changing the setup positions of the monitoring positions, and adding new monitoring positions, etc.

In some embodiments, a number of monitoring positions in each group of candidate monitoring position set may not exceed a position number threshold. The position number threshold refers to a number of positions that do not result in a waste of resources while meeting monitoring needs. The position number threshold may be obtained by manual setting.

In some embodiments of the present disclosure, by setting the count of monitoring positions contained in the candidate monitoring position set, it may be possible to avoid generating too many positions, which results in the waste of monitoring resources.

The regional coverage rate refers to a ratio of a sum of coverages of all the monitoring positions included in the candidate monitoring position set in a certain space. In some embodiments, the regional coverage rate may include a first regional coverage rate and a second regional coverage rate. The first regional coverage rate refers to a ratio of a sum of the coverages of all the monitoring positions in the candidate monitoring position set to a spatial range of the comprehensive pipeline gallery. The spatial range of the comprehensive pipeline gallery may be a plan area. The second regional coverage rate refers to a ratio of a sum of the coverages of all the monitoring positions set in the high-risk region and/or the critical region in the candidate monitoring position set to a spatial range of the high-risk region and/or the critical region.

In some embodiments, the smart gas device management platform may determine a coverage of the monitoring positions based on an effective monitoring distance of the monitoring device. For example, the smart gas device management platform may determine a spherical region centered on the monitoring position with a radius of the effective monitoring distance of the monitoring device as the coverage of the monitoring position.

In some embodiments, the smart gas device management platform may determine the first regional coverage rate based on a sum of the coverages of all of the monitoring positions in the candidate monitoring position set and the spatial range of the comprehensive pipeline gallery. In some embodiments, the smart gas device management platform may determine the second regional coverage rate based on a sum of the coverages of all the monitoring positions in the candidate monitoring position set that are set in the high-risk region and/or the critical region and the spatial range of the high-risk region and/or the critical region.

The target monitoring position set refers to a finalized monitoring position set. The target monitoring position set may include one or more first monitoring positions of the gas cabins within different preset roadway ranges and one or more second monitoring positions of the other cabins within different preset roadway ranges.

In some embodiments, the smart gas device management platform may determine the target monitoring position set based on the regional coverage rate in various manners. In some embodiments, the smart gas device management platform may designate the candidate monitoring position set whose first regional coverage rate is greater than a first preset threshold, and/or the candidate monitoring position set whose second regional coverage rate is greater than a second preset threshold as the target monitoring position set.

In some embodiments, the smart gas device management platform may select, from the at least one candidate monitoring position set and based on the first regional coverage rate, a candidate monitoring position set whose first regional coverage rate is greater than the first preset threshold as the first monitoring position set. The smart gas device management platform may further select, from the at least one candidate monitoring position set and based on the second regional coverage rate, a candidate monitoring position set whose second regional coverage rate is greater than the second preset threshold as the target monitoring position set. The first preset threshold refers to the first regional coverage rate when the sum of the coverages of all the monitoring positions in the comprehensive pipeline gallery reaches a preset range. The second preset threshold refers to the second regional coverage rate when the sum of the coverages of all the monitoring positions set in the high-risk region and/or the critical region reaches the preset range. The first preset threshold, the second preset threshold, and the preset range may be preset based on a priori knowledge or historical data.

In some embodiments, the smart gas device management platform may also calculate a coverage validity distribution of the candidate monitoring position set; and determine, based on the regional coverage rate and the coverage validity distribution, the target monitoring position set.

The coverage validity distribution refers to a vector or a sequence used to characterize a coverage validity of each monitoring position in the candidate monitoring position set. The coverage validity of the monitoring position refers to a range of the monitoring data with a high degree of reliability within the effective monitoring distance of the monitoring position. When the coverage validity of the monitoring position is relatively high, it indicates that the monitoring position is within the effective monitoring distance of the monitoring position, the monitoring data for most region has a relatively high degree of reliability.

In some embodiments, the smart gas device management platform may determine the coverage validity distribution of the candidate monitoring position set based on a coverage validity of an assessment position.

The assessment position refers to a position used to test and calculate the coverage validity of the monitoring position. In some embodiments, the smart gas device management platform may randomly generate at least one assessment position within the effective monitoring distance of each monitoring position in the candidate monitoring position set. A count of the assessment positions may be greater than a count of the monitoring positions in the candidate monitoring position set. In some embodiments, the smart gas device management platform may randomly generate at least one group of candidate assessment positions from which a group of assessment positions is artificially determined.

In some embodiments, the smart gas device management platform may determine at least one group of assessment position based on a preset rule. In some embodiments, the preset rule may be: dividing the comprehensive pipeline gallery with a grid, and determining the assessment positions based on the positions of the grid. For example, at least one assessment position may be determined within each grid.

In some embodiments, the smart gas device management platform may determine the coverage validity of the assessment position based on the effective monitoring distance of the monitoring position, and a distance relationship between neighboring monitoring positions and the assessment position. The neighboring monitoring positions refer to two monitoring positions in different directions that are closest to the assessed position. For example, the neighboring monitoring positions may be two monitoring positions that are closest to the left and right sides of the assessment position, respectively.

Merely as an example, the smart gas device management platform may determine the coverage validity of the assessment positions based on the following formula: the coverage validity=the effective monitoring distance/(the first distance+the second distance). The first distance and the second distance denote distances between neighboring monitoring positions in two different directions that are closest to the assessment position and the assessment position location, respectively.

In some embodiments, the smart gas device management platform may determine the coverage validity of the monitoring position based on an average value of the coverage validity of at least one assessment position within the effective monitoring distance of the monitoring position. By calculating the coverage validity for each of the monitoring positions in the candidate monitoring position set, the coverage validity distribution for the candidate monitoring position set may be obtained.

In some embodiments, the smart gas device management platform may select, from the at least one candidate monitoring position set and based on the first regional coverage rate, the candidate monitoring position set whose first regional coverage rate is greater than the first preset threshold as the first monitoring position set. The smart gas device management platform may further select, from the at least one candidate monitoring position set and based on the second regional coverage rate, the candidate monitoring position set whose second regional coverage rate is greater than the second preset threshold as the target monitoring position set. The smart gas device management platform may further determine the target monitoring position set from the at least one group of second monitoring position set based on the coverage validity distribution of the candidate monitoring position set. The first monitoring position set refers to a candidate monitoring position set whose first regional coverage rate is greater than the first preset threshold. The second monitoring position set refers to a candidate monitoring position set whose first regional coverage rate is greater than the first preset threshold and whose second regional coverage rate is greater than the second preset threshold.

In some embodiments, the smart gas device management platform may determine the average value of the coverage validity of each monitoring position in the coverage validity distribution of the second monitoring position set, and the second monitoring position set with the greatest average value may be designated as the target monitoring position set.

In some embodiments, the smart gas device management platform may designate a second monitoring position set with a highest effective proportion as the target monitoring position set. The effective proportion refers to a proportion of the monitoring positions in the second monitoring position set whose coverage validities are greater than a validity threshold. The validity threshold may be a threshold related to the coverage validity of the monitoring position. The higher the effective proportion, the higher the coverage validity distribution for the corresponding monitoring point set.

In some embodiments, the target monitoring position set may also be determined by manually comparing the coverage validity distributions of different second monitoring position sets.

In some embodiments of the present disclosure, the coverage validity of the monitoring position may be determined by assessing the coverage validity of the assessment position, and the target monitoring position set may be further determined, it may be ensured that the count of monitoring positions is determined in such a manner that the monitoring data is more reliably selected for the monitoring position set.

In some embodiments, the smart gas device management platform may centralize the target monitoring positions, and a plurality of monitoring positions belonging to the same preset roadway range may be divided into one monitoring position combination. In some embodiments, the monitoring position combination may also be adjusted manually. For example, when a situation occurs in which a cabin is detached from other cabins, such as when the pipeline or a device within a cabin is interspersed to other cabins, it may be necessary for a staff member to adjust the monitoring positions for the cabin, such as to set the interspersed position as the monitoring position.

In some embodiments of the present disclosure, by determining the monitoring position combination based on the pipeline gallery distribution feature, the high-risk region distribution, and the critical region distribution, it may be ensured that the regions prone to accidents or in need of monitoring achieve complete coverage, so as to effectively reduce a risk of incidence and improve a safety of the comprehensive pipeline gallery. Moreover, in some embodiments of the present disclosure, the target monitoring position set may further be determined by calculating the regional coverage rate, which ensures that the monitoring positions in the target monitoring position set covers the comprehensive pipeline gallery, the high-risk region, and/or the critical region to the greatest extent. At the same time, it may be possible to control the count of the monitoring positions under a premise of ensuring that the critical regions are all covered, and avoid a waste of resources.

In 220, a joint risk of the one or more first monitoring positions may be determined based on the first monitoring data and the second monitoring data.

Several nearby monitoring positions may influence each other within the same gas cabin, which indicates that risks between the monitoring positions may be interconnected and the risks between several nearby monitoring positions may propagate to a specific monitoring position, affect the specific monitoring position, and create the joint risk at the specific position. The several nearby monitoring positions refer to other monitoring positions within the same gas cabin that are adjacent to or close to the specific monitoring position. The other monitoring positions may be monitoring positions set at a device, a pipeline, a sensor, or other related elements associated with the specific monitoring position. For example, within the gas cabin, there may be a risk of a gas leak at a first monitoring position A and a risk of a fire at a second monitoring position B. When the gas leaks, a fire may be more likely to occur; and the source of the fire may cause the leaking gas to burn or explode, resulting in an even greater risk. Therefore, there may be the joint risk at a first monitoring position C, which is adjacent to the first monitoring position A and the second monitoring position B.

In some embodiments, the joint risk may include a joint risk type and a joint risk level. The joint risk type may include one or more of flooding, fire, combustible gas leak, etc. The joint risk level may reflect an urgency degree and a potential impact degree of the joint risk. For example, the higher the joint risk level, the higher the urgency degree and the potential impact degree of the joint risk. The potential impact degree may be a magnitude of the impact after the risk occurs. More descriptions of the potential impact degree may be found in FIG. 3 and the related descriptions.

In some embodiments, the smart gas device management platform may determine the joint risk of the one or more first monitoring positions based on the first monitoring data corresponding to the one or more first monitoring positions in the monitoring position combination, and the second monitoring data corresponding to the one or more second monitoring positions in the monitoring position combination, by querying a first preset table. The first preset table may include a correspondence between the first monitoring data, the second monitoring data, and the joint risk of the one or more first monitoring positions in the monitoring position combination, and the information in the first preset table may be determined based on the historical data. In the same manner, the joint risks of the one or more first monitoring positions in the plurality of the monitoring position combinations may be determined based on the monitoring data of the plurality of the monitoring position combinations, respectively.

In some embodiments, the smart gas device management platform may determine an independent risk of the one or more first monitoring positions based on the first monitoring data and the second monitoring data; and determine the joint risk of the one or more first monitoring positions based on the independent risk of the first monitoring position. More descriptions of determining the joint risk may be found in FIG. 3 and the related descriptions.

In 230, a maintenance parameter may be determined, and/or at least one monitoring parameter may be adjusted based on the joint risk.

The maintenance parameter refers to a parameter related to maintenance or maintenance work. For example, the maintenance parameter may include: the one or more first monitoring positions that need to be maintained, at least one maintenance type corresponding to the one or more first monitoring positions that need to be maintained, a count of maintenance personnel corresponding to the maintenance type, a maintenance time, etc.

The maintenance type refers to a type of measure for the maintenance. In some embodiments, the maintenance type may be related to a type of the joint risk of the one or more first monitoring positions to be maintained. For example, the maintenance type may be to take waterproofing measures when the joint risk type is a flood risk, and the maintenance type may be to regulate an exhaust fan when the joint risk type is a smoke risk.

In some embodiments, the number of maintenance personnel may be related to the maintenance type. For example, the smart gas device management platform may preset the number of maintenance personnel corresponding to different types of maintenances based on the historical data. The maintenance time may be a limit on the latest time to perform the maintenance or overhaul. As there may be more than one monitoring position that needs to be repaired, and there is a limited number of maintenance personnel and maintenance devices, there may be a need to determine the maintenance time for each monitoring position based on the joint risk.

In some embodiments, the smart gas device management platform may determine the maintenance parameter by querying a second preset table based on the joint risk type and the joint risk level included in the joint risk. The second preset table may include a correspondence between the joint risk type, the joint risk level, and the maintenance parameter, and the second preset table may be determined based on the historical data.

The at least one monitoring parameter refers to relevant parameter used to monitor and assess the joint risks. For example, the at least one monitoring parameter may include a frequency of calculation of monitoring data for the monitoring position. The frequency of calculation of monitoring data refers to the frequency of calculating the joint risk using the monitoring data. For example, under a normal condition, the joint risk of all monitoring positions may be calculated every hour. After the maintenance/overhaul, the frequency of calculation of monitoring data for the maintained monitoring position may be changed to calculating the joint risk every half hour.

In some embodiments, the second preset table may further include the correspondence between the joint risk type, the joint risk level, and the monitoring parameter. Correspondingly, the smart gas device management platform may determine a target monitoring parameter based on the joint risk type and the joint risk level included in the joint risk by querying the second preset table, and adjust the current monitoring parameter based on the target monitoring parameter. The target monitoring parameter refers to the adjusted monitoring parameter.

Step 240, an adjustment instruction may be generated based on adjustment amount of the at least one monitoring parameter, an adjustment priority of the at least one monitoring parameter may be determined based on a data uploading intensity of the gas cabin, and the adjustment instruction may be sent sequentially to the corresponding one or more first monitoring positions based on the adjustment priority.

The adjustment instruction refers to instruction data that contains adjustments to the at least one monitoring parameter of some of the monitoring positions in the gas cabin.

In some embodiments, the smart gas device management platform may generate the adjustment instruction based on an adjustment amount of the monitoring parameter. For example, the adjustment instruction generated may be a computer code, by which the adjustment of the monitoring position, the detection item (e.g., a temperature, etc.), the frequency of calculation of the monitoring data, and other contents are realized.

The adjustment amount of the monitoring parameter refers to a value, a magnitude, or a direction in which the at least one monitoring parameter is adjusted. The adjustment amount of the monitoring parameter may be determined based on the difference between the target monitoring parameter and a current monitoring parameter.

The data uploading intensity refers to a density of the monitoring data obtained from each cabin and uploaded to the smart gas device management platform, reflecting a frequency of data uploading and a data volume.

In some embodiments, the data uploading intensity may be determined based on a bandwidth utilization rate of the gas cabin.

The bandwidth utilization rate of the gas cabin refers to a ratio of an actual bandwidth used to an available bandwidth in the network. For example, a higher the bandwidth utilization rate may indicate that a network connection or a device is using bandwidth resources efficiently, whereas a lower bandwidth utilization rate may indicate wasted resources or a network congestion.

In some embodiments, the smart gas device management platform may determine the data of the gas cabin based on the bandwidth utilization rate of a plurality of communication lines included in the gas cabin and a total uploaded data volume of the gas cabin. The communication lines refer to connection paths for transmitting signals and data. The total uploaded data volume of the gas cabin refers to a sum of the data that is uploaded to the smart gas device management platform within a certain period of time.

Merely by way of example, the smart gas device management platform may determine a data uploading intensity t based on an average of the bandwidth utilization rates of the plurality of communication lines and the total uploaded data volume of the gas cabin by the following formula (1):

$$t = k1 \times a + k2 \times b \tag{1}$$

wherein t denotes the data uploading intensity, a denotes the average of the bandwidth utilization rates of the plurality of communication lines, and b denotes the total uploaded data volume of the gas cabin. k1 and k2 denote preset weight coefficients that are set based on an actual situation.

The adjustment priority refers to an order in which the smart gas device management platform adjusts the at least one monitoring parameter of different first monitoring positions. Setting the priority may ensure that high priority first monitoring positions are prioritized when resources are limited or time is of the essence.

In some embodiments, the smart gas device management platform may determine the adjustment priority of the at least one monitoring parameter based on the data uploading intensity of the gas cabin. For example, the higher the data uploading intensity, the higher the adjustment priority.

In some embodiments, the smart gas device management platform may send the adjustment instruction based on the adjustment priority. For example, the monitoring parameter with a higher priority may be prioritized, the earlier the adjustment instruction may be sent, thereby ensuring that the corresponding one or more first monitoring positions are processed as early as possible.

In some embodiments of the present disclosure, the joint risk of the one or more first monitoring positions may be determined based on the first monitoring data and the second monitoring data, which enables consideration of the impact of the risk situation of the other cabins on the gas cabin, so as to comprehensively assess the risk situation of each of the one or more first monitoring positions in the gas cabin. The maintenance parameter may be determined and/or the at least one monitoring parameter may be adjusted based on the joint risk, which may allow for precise adjustment and optimization of the gas facilities (e.g., the gas pipeline, the gas device, the monitoring device, etc.), resulting in improving the operational efficiency of the gas facilities, reducing energy consumption, extending the device life, and optimizing the performance of the entire gas system in the pipeline gallery. The adjustment instruction may be generated based on the adjustment amount of the monitoring parameter, which enables precise management and optimization of the gas facilities. The data uploading intensity based on the bandwidth utilization rate of the gas cabin may be determined, which helps to reasonably arrange data uploading activities to avoid excessive data transmission, conserve the network bandwidth resources, and improve the efficiency and stability of data transmission. Finally, the monitoring positions with higher risks may be processed based on the adjustment priority to ensure that high-risk regions receive timely attention and treatment, thereby improving overall safety and reliability.

Figure 3:
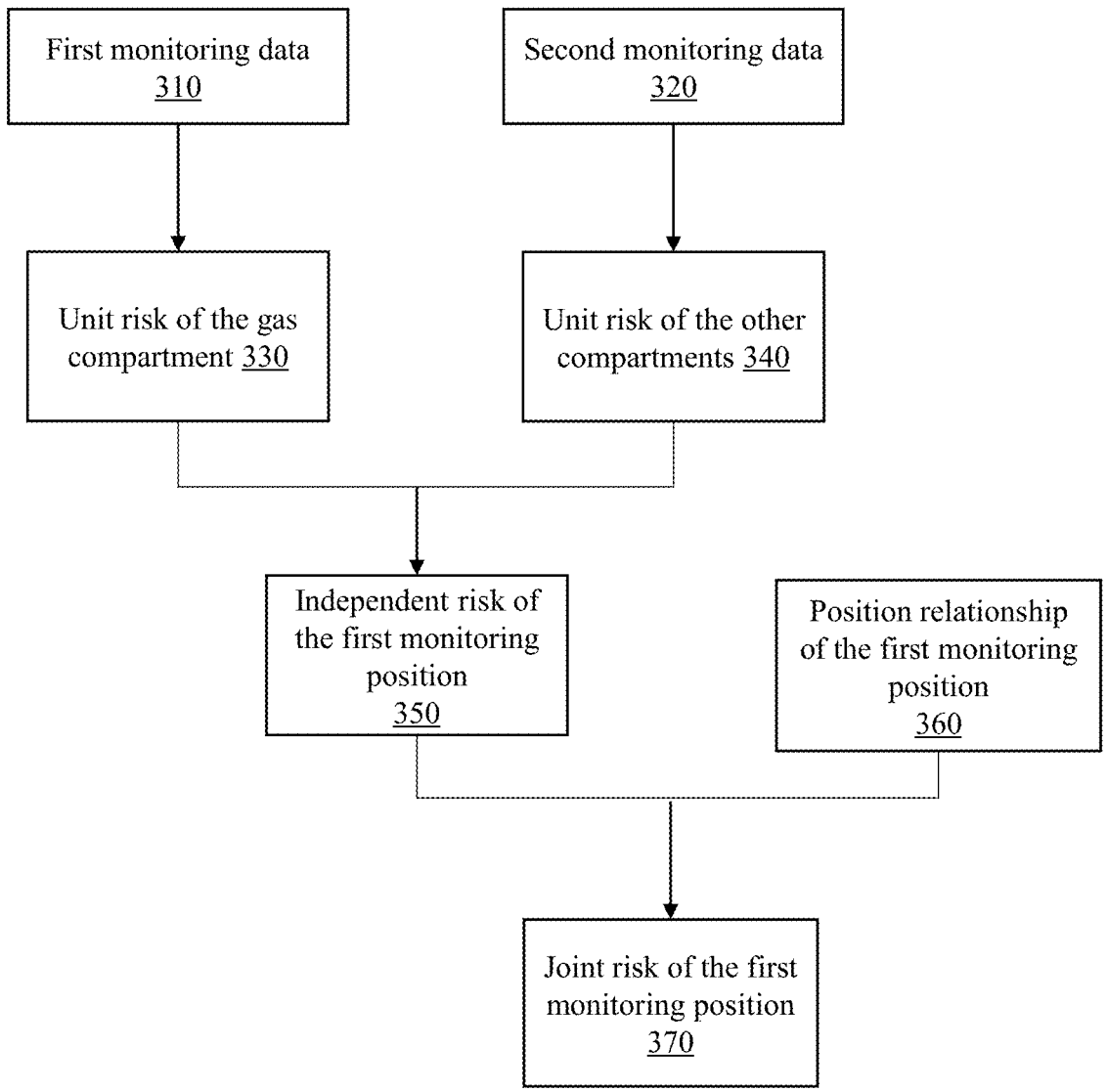
FIG. 3 is a schematic diagram illustrating an exemplary process for determining a joint risk according to some embodiments of the present disclosure.

FIG. 3 is a schematic diagram illustrating an exemplary process for determining a joint risk according to some embodiments of the present disclosure.

Referring to FIG. 3, in some embodiments, the smart gas device management platform may determine an independent risk 350 of a first monitoring position based on first monitoring data 310 and second monitoring data 320; and determine a joint risk of the one or more first monitoring positions 370 based on the independent risk 350 of the first monitoring position.

The independence risk refers to a risk of second monitoring data of other cabins at a second monitoring point affecting the monitoring data at a first monitoring point in a gas cabin in a monitoring position combination. The independent risk may include an independent risk type and an independent risk level. The independent risk type may include one or more of a flood, a fire, an explosion, a smoke, a gas leakage, etc. A plurality of risk types may be included in the independent risk type for each of the one or more first monitoring positions. The independent risk level refers to an indicator of a severity of the independent risk. The higher the independent risk level, the higher the severity of the independent risk. The independent risk levels of different independent risk types may be determined based on the monitoring data corresponding to that independent risk type.

In some embodiments, the smart gas device management platform may determine the independent risk of each of the one or more first monitoring positions in the monitoring position combination based on the first monitoring data corresponding to each of the one or more first monitoring position in the monitoring position combination and the second monitoring data corresponding to the one or more second monitoring positions by querying a third preset table. The third preset table may include a correspondence between the first monitoring data, and the second monitoring data of the monitoring position combination, and the independent risk of each of the one or more first monitoring positions in the monitoring position combination. The third preset table may be determined based on the historical data.

The smart gas device management platform may determine the independent risks of the one or more first monitoring positions in the plurality of monitoring position combinations based on the monitoring data of the plurality of monitoring position combinations in the same manner, respectively.

Referring to FIG. 3, in some embodiments, the smart gas device management platform may determine a unit risk 330 of the gas cabin and a unit risk 340 of the other cabins based on the first monitoring data 310 and the second monitoring data 320; and determine the independent risk 350 of each of the one or more first monitoring positions by a preset algorithm based on the unit risk 330 of the gas cabin and the unit risk 340 of the other cabins.

The unit risk refers to the risk that exists in the other cabins. Similar to the independent risk, the unit risk may include a unit risk type and a unit risk level. The unit risk type may include one or more of a flood, a fire, an explosion, a smoke, a gas leak, etc. The unit risk type for a cabin may include a plurality of risk types. The unit risk level refers to an indicator of the severity of the unit risk.

The unit risk type of the other cabins may be different due to differences in a type of pipeline contained and the contents being transported in the other cabins, etc. For example, a power cabin and a hydraulic cabin may contain different types of pipelines. The power cabin may contain a power supply pipeline and the hydraulic cabin may contain a water supply pipeline. The hydraulic cabin may not have unit risk types such as power leakage in general.

In some embodiments, the smart gas device management platform may determine the unit risk type for the gas cabin based on the first monitoring data; and determine the unit risk type of the other cabins based on the second monitoring data.

In some embodiments, the smart gas device management platform may determine an abnormal data type of the gas cabin based on the first monitoring data and a standard data range; and, determine the unit risk type of the gas cabin through querying a risk comparison table based on the abnormal data type of the gas cabin.

The standard data range refers to a normal fluctuation range of the monitoring data. If a value of the monitoring data is not in the standard data range, the monitoring data may be abnormal. Different types of the first monitoring data correspond to different standard data ranges. The standard data range may be preset by the system based on the historical data or determined manually.

In some embodiments, the smart gas device management platform may determine the first monitoring data that is not in the standard data range as abnormal data, and determine a type of the first monitoring data as the abnormal data type.

In some embodiments, the risk comparison table may include correspondences between different abnormal data types and different unit risk types. In some embodiments, one abnormal data type may correspond to one or more unit risk types. The risk comparison table may be preset based on the historical data and a prior knowledge.

In some embodiments, the smart gas device management platform may determine the abnormal data type of the other cabins based on the second monitoring data and the standard data range; and determine unit risk type of the other cabin through querying the risk comparison table based on the abnormal data type of the other cabins. The manner of determining the unit risk types of the other cabins may be similar to the manner of determining the unit risk type of the gas cabin. For more illustrations, please refer to the above descriptions.

In some embodiments, the smart gas device management platform may determine the unit risk level for the cabin based on the monitoring data and a risk threshold. For example, the smart gas device management platform may determine the unit risk level of the gas cabin based on the first monitoring data and a first risk threshold. As another example, the smart gas device management platform may determine the unit risk level of the other cabins based on the second monitoring data and a second risk threshold.

The risk threshold refers to a critical value that the monitoring data reaches when a certain type of unit risk type occurs in the cabin. Different unit risk types may correspond to different risk thresholds. The risk thresholds may be determined based on the historical data, experimental data, or manually determined. In some embodiments, the risk threshold may include the first risk threshold and the second risk threshold. The first risk threshold refers to a critical value that is reached by the first monitoring data when a certain type of unit risk type occurs in the gas cabin. The second risk threshold refers to a critical value reached by the second monitoring data when a certain type of unit risk type occurs in the other cabins.

In some embodiments, the smart gas device management platform may determine an estimated time for the monitoring data to reach the risk threshold, and determine the unit risk level for the cabin based on the estimated time. For example, the smart gas device management platform may determine an estimated time for the first monitoring data to reach the first risk threshold, and determine the unit risk level for the gas cabin based on the estimated time. As another example, the smart gas device management platform may determine an estimated time for the second monitoring data to reach the second risk threshold, and determine the unit risk level of the other cabins based on the estimated time.

The estimated time refers to an amount of time it takes for the current monitoring data to reach the risk threshold. The shorter the estimated time, the closer the current monitoring data is to the risk threshold, and the higher the unit risk level.

In some embodiments, the smart gas device management platform may determine the estimated time for different types of the monitoring data to reach the corresponding risk thresholds through a prediction model based on the type of cabins, the plurality of groups of the first monitoring data, the plurality of groups of the second monitoring data, and the corresponding risk thresholds of all the monitoring positions at a plurality of time points.

The prediction model refers to a model used to determine the estimated time. The prediction model may be a machine learning model, such as, a recurrent neutral network (RNN) model or a temporal model such as a long short-term memory (LSTM) model. Inputs to the prediction model may include a type of the cabin, the plurality of groups of the first monitoring data and the plurality of groups of the second monitoring data at the plurality of time points, and the corresponding risk thresholds of all monitoring positions; and outputs may be the different types of monitoring data corresponding to the estimated time. The type of cabin may include the gas cabin, the power cabin, the hydraulic cabin, etc. The group of the first monitoring data may include a plurality of types of the first monitoring data obtained at a single time point by all of the monitoring positions in the gas cabin. The group of the second monitoring data may include a plurality of types of the second monitoring data obtained at a single time point by all of the monitoring positions in each of the other types of cabins. There may be a plurality of risk thresholds input into the prediction model, each risk threshold corresponding to one type of the monitoring data.

In some embodiments, the smart gas device management platform may train the prediction model based on a great number of first samples with first labels. The first samples may include sample cabin types, a plurality of groups of sample first monitoring data and a plurality of groups of sample second monitoring data at all monitoring positions at a plurality of time points, and sample risk thresholds. The first label may be the estimated time corresponding to the plurality of types of monitoring data. The smart gas device management platform may obtain the first samples and the first labels based on the historical data. In some embodiments, the smart gas device management platform may be trained in various manners based on the first samples. For example, the training may be based on a gradient descent method.

In some embodiments, the smart gas device management platform may determine the unit risk level for the cabin based on the estimated time. The unit risk level may be negatively correlated with the estimated time. The shorter the estimated time, the higher the unit risk level.

In some embodiments, the smart gas device management platform may determine the independent risk level of each of the one or more first monitoring positions by the preset algorithm based on the unit risk of the gas cabin and the unit risks of the other cabins. The preset algorithm may be in various forms. For example, the preset algorithm may be a weighted algorithm, such as: independent risk level corresponding to an independent risk type 1=k0*unit risk level corresponding to a unit risk type 1 in the gas cabin+k1*unit risk level corresponding to the unit risk type 1 in other cabins 1+k2*unit risk level corresponding to the unit risk type 1 in other cabin 2+ . . . +kn*unit risk level corresponding to the unit risk type 1 in the other cabin n. Where, k0, k1 . . . kn denote the corresponding weights. The unit risk type 1 denotes the same risk type as the independent risk type 1.

In some embodiments, the weights may be related to the risk type, and the distance of the other cabins from the gas cabin. Different risk type may have different propagation rate and different weight. The distance between the other cabins and the gas cabin may be determined by the distance between center axes within the cabins. The weight may indicate the propagation rate of the unit risk, and the higher the weight, the faster the propagation rate of the unit risk. For example, in a case of a fixed material on the walls of a cabin, the closer the distance between a cabin and the gas cabin, the higher the propagation rate of the unit risk in that cabin, and the greater the corresponding weight, the shorter the time to cause the occurrence of the risk type in the gas cabin, the more urgent the situation, and the higher the independent risk level.

In some embodiments, the smart gas device management platform may determine the propagation rate of the unit risk by actual experiments or modeling experiments with different unit risk types and different distances between the other cabins and the gas cabin; and determine the weight of the unit risk level for each cabin by querying a weight comparison table. The weight comparison table may contain various relationships between different unit risk types, different distances between other cabins and the gas cabins, propagation rate of the risks, and the weights in the historical experiments.

In some embodiments of the present disclosure, determining the independent risk of each of the one or more first monitoring positions by the unit risk of the cabins may allow the assessment of the risk of each individual cabin and determine the propagation rate of the risk by the connection between the cabins, such as the distance, etc., and may effectively improve the accuracy of the independent risk determination by taking into account the impact of different types of risks in different cabins on the gas cabins.

Referring to FIG. 3, in some embodiments, the smart gas device management platform may also determine the joint risk of the one or more first monitoring positions 370 based on the independent risk of each of the one or more first monitoring positions 350, and a position relationship of the one or more first monitoring positions 360.

In some embodiments, the position relationship may include a risk propagation distance, a spatial angle, a spatial direction, etc. between any two first monitoring positions in the gas cabin. As a path of risk propagation is not necessarily a straight line, the risk propagation distance may not be a straight line distance between the two monitoring positions. For example, when the flooding occurs, the water may not necessarily flow in a straight line. The spatial angle refers to a slope in an extension direction of the pipeline gallery. In some embodiments, the smart gas device management platform may obtain position coordinates of the one or more first monitoring positions based on a position setting record stored in a database; calculate the spatial angle between any two first monitoring positions in the same gas cabin based on the position coordinates.

In some embodiments, the smart gas device management platform may determine the joint risk based on the independent risk of each of the one or more first monitoring positions and the position relationship of the one or more first monitoring positions. In some embodiments, the smart gas device management platform may determine an initial joint risk of a target first monitoring position in the foregoing manner based on the independent risk of each of the one or more first monitoring positions; determine an adjustment parameter based on the position relationship between the one or more first monitoring positions; and adjust the initial joint risk based on the adjustment parameter, and determine the joint risk of the target first monitoring position. The target first monitoring position may be the first monitoring position for which the joint risk is to be determined.

In some embodiments, the smart gas device management platform may determine the adjustment parameter based on the risk propagation distances in the position coordinates, and adjust the joint risk level of the initial joint risk based on the adjustment parameter. The correspondence between different risk propagation distances and different adjustment parameters may be determined based on the historical data or the prior knowledge. For example, when the risk propagation distance is s meters, the corresponding adjustment parameter may be f. The smart gas device management platform may adjust the current independent risk level r to (r*f), (r−f) or (r+f).

In some embodiments, the smart gas device management platform may construct a risk map based on the independent risk of each of the one or more first monitoring positions, and the position relationship of the one or more first monitoring positions; and determine the joint risk through a risk determination model based on the risk map.

The risk map refers to a graph structure that indicates the relationship between the one or more first monitoring positions. The risk map may include nodes and edges. The edges may connect the nodes, and the nodes and the edges may have features. In some embodiments, the nodes of the risk map may correspond to the one or more first monitoring positions of the gas cabin, and the node feature may include the independent risk of each of the one or more first monitoring positions. The edges of the risk map may indicate pipeline connection relationships between the one or more first monitoring positions. The risk map may include directed and undirected edges. A direction of the directed edge may be determined based on an elevation difference. For example, the direction of the directed edge may be a direction of the elevation from high to low. The undirected edge may exist between nodes of the same elevation. Edge features of the risk map may include the spatial angle and the risk propagation distance.

In some embodiments, the node features of the risk map may further include a coverage validity of the nodes corresponding to the one or more first monitoring positions. More descriptions of the coverage validity may be found in FIG. 2 and the related contents.

The smart gas device management platform may determine the joint risk in a variety of manners based on the risk map.

In some embodiments, the smart gas device management platform may determine a key node of the risk map, and determine the joint risk of the one or more first monitoring positions based on the independent risk of the key node corresponding to the one or more first monitoring positions and the independent risk of a target node corresponding to the one or more first monitoring positions. The target node may be a node position corresponding to the one or more first monitoring positions whose joint risk is to be determined.

The key node may be a node in the risk map that is included in the joint risk calculation. The key node may be different in the calculation of the joint risk of the different first monitoring positions. In some embodiments, the smart gas device management platform may determine a node within a specific distance range from the first monitoring position as the key node corresponding to the first monitoring position. In some embodiments, the specific distance range may be a distance range corresponding to the risk propagation distance of the first monitoring position. In some embodiments, the specific distance range may also be a system default, a human preset value, etc.

In some embodiments, the smart gas device management platform may determine the joint risk of the target first monitoring position through a weighted summation based on the independent risk corresponding to the key node and the independent risk of the target first monitoring position. The joint risks of the different target first monitoring positions may be determined based on different target nodes and their corresponding different key nodes.

In some embodiments, the smart gas device management platform may calculate the joint risk level based on different independent risk types by using the following formula: joint risk level of the target node=independent risk level of the target node+p1*independent risk level of key node 1+p2*independent risk level of key node 2+ . . . +pm*independent risk level of key node m.

Where, p1, p2 . . . pm denote the weights of the independent risk levels of the key node 1, the key node 2 . . . the key node m.

The weights may be correlated with the risk propagation distance and the spatial angle. The weight may be negatively correlated with the risk propagation distance. The greater the risk propagation distance between the nodes, the smaller the nodes interact with each other, and the smaller the weights of the corresponding independent risk levels. In some embodiments, the correlation between the weights and the spatial angles may be different for the different risk types. For example, when the risk type is the flood, an upstream node may have a great impact on a downstream node, thus the weight of the independent risk level corresponding to the upper stream may be higher relative to the weight of the independent risk level corresponding to the downstream node.

In some embodiments, the smart gas device management platform may also determine the joint risk based on the risk determination model. The risk determination model may be a machine learning model, such as, a graph neural network (GNN) model. In some embodiments, the risk determination model may process the risk map and determine the joint risk.

An input of the risk determination model may be the risk map and an output may be the joint risk. The node output from the GNN may correspond to the joint risk of the one or more first monitoring positions.

In some embodiments, the smart gas device management platform may train the risk determination model based on a great number of second samples with second labels. The second samples may include a sample risk map. The nodes of the sample risk map and the features, and the edges of the sample risk map and their features may be similar to the above description. The second label may be the joint risk type and the joint risk level corresponding to each of the nodes in the sample risk map. The smart gas device management platform may determine the sample risk map based on the historical data.

In some embodiments, the joint risk level in the second label may be determined manually or based on a maintenance level. The maintenance level refers to a level of maintenance performed for the first monitoring position corresponding to the node. The maintenance level may be determined based on maintenance personnel and maintenance time in historical maintenance parameters. The more maintenance personnel and the shorter the maintenance time, the higher the maintenance level of the node. The maintenance personnel and the maintenance time in the historical maintenance parameters may be assigned and planned based on manual experience. For example, the maintenance level may be determined based on the following formula: maintenance level=a1*number of maintenance personnel+a2/maintenance time. Where, a1 and a2 denotes weights corresponding to the number of maintenance personnel and the maintenance time, which may be determined manually. In some embodiments, the maintenance level may be determined as the joint risk level.

In some embodiments, the smart gas device management platform may correct the output of the risk determination model based on a potential impact degree of the first monitoring position, and determine a corrected joint risk.

The potential impact degree refers to the degree of impact caused by an occurrence of a risk event at the monitoring position. The potential impact degree may be determined by population, region size, and critical infrastructure of the region corresponding to the monitoring position.

The region corresponding to the monitoring position refers to a range of the region affected by an abnormality at the monitoring position. In some embodiments, the region corresponding to the monitoring position may be determined through a gas network plan. For example, the risk event happened at the monitoring position may impact the street A and neighborhood B, then the region corresponding to the monitoring position may be the street A and the neighborhood B.

The population may also be obtained through censuses, government statistical reports, and population geographic information systems (GIS). The region size of the region corresponding to the monitoring position may be measured using an online map tool. The critical infrastructure may include public safety facilities, schools and educational facilities, healthcare facilities, airports and air transportation facilities, railroad stations, and subway stations, etc. It may be noted that there may be a plurality of monitoring positions in one region. The population, the region size, and the critical infrastructure of the plurality of monitoring positions may be the same.

In some embodiments, the smart gas device management platform may perform a weighted calculation to determine the potential impact degree after performing normalization calculations on the population, the region size, and a number of the critical infrastructures of the region corresponding to the monitoring position, respectively. The normalization calculation refers to a unification of the dimensions of three data into the same range, which facilitates the subsequent calculation. For example, if the difference between the values of region size and the number of the critical infrastructures is too great, a direct calculation may not be performed, and it may be more convenient to perform the weighted calculation after all the values are unified into the range of 0-10 by the normalization calculation. The range of the normalized data and the weights corresponding to each of the three types of data for weighting calculations may be determined manually.

In some embodiments, the smart gas device management platform may multiply the joint risk level determined through the risk map with the potential impact degree to produce the corrected joint risk.

In some embodiments of the present disclosure, when determining the joint risk based on the independent risk, the impact of the independent risks of several nearby first monitoring positions within the same gas cabin on the first monitoring position may be considered. By determining the joint risk based on the independent risk and the position coordinates, the impact of the independent risk of the several nearby first monitoring positions on the first monitoring position may be clarified. Through the construction of the risk map, the position coordinates of the one or more first monitoring positions may be expressed in a more intuitive and simpler way, which clarifies the connection between each monitoring position and between the monitoring positions and pipelines, so as to control a layout of the monitoring positions of the whole comprehensive pipeline gallery, more intuitively show the propagation and the impact of the risk, and improve the efficiency and accuracy of calculating the joint risk. By using the coverage validity degree as the node feature, the monitoring data at the monitoring positions may be taken into account, so as to ensure the validity of the monitoring data and improve the reliability of the risk map. By correcting the joint risk by the potential impact degree, after comprehensively assessing the impact of the monitoring position on the surrounding region, a priority may be given to the monitoring position with greater impact after the risk occurs, thereby improving a scheduling rationality of the limited personnel and device, in order to designate countermeasures in advance to prevent the occurrence of dangerous situations and minimize the losses caused by the risk.

Some embodiments of the present disclosure provide a device for monitoring of gas facilities in a comprehensive pipeline gallery based on the IoT, including a processor. The processor may be configured to executed the method for safety monitoring of gas facilities in a comprehensive pipeline gallery based on the IoT described in any one of the embodiments of the present disclosure.

Some embodiments of the present disclosure provide a computer-readable storage medium storing computer instructions, and when reading the computer instructions in the storage medium, a computer executes the method for safety monitoring of gas facilities in a comprehensive pipeline gallery based on the IoT described in any one of the embodiments of the present disclosure.

When describing the operations performed in the embodiments in the present disclosure by steps, an order of the steps may all be interchangeable, the steps may be omitted, and other steps may be included in the process of the operations if not otherwise specified. The embodiments in the present disclosure are for the purpose of exemplification and illustration only, and do not limit the scope of application of the present disclosure. For those skilled in the art, various amendments and changes may be made under the guidance of the present disclosure, and these amendments and changes remain within the scope of the present disclosure. Some features, structures, or characteristics of one or more embodiments of the present disclosure may be suitably combined.

Aspects of the present disclosure may be performed entirely by hardware, entirely by software (including firmware, resident software, microcode, etc.), or by a combination of hardware and software. All of the above hardware or software may be referred to as a "block," "module," "engine," "unit," "component," or "system. Additionally, aspects of the present disclosure may be manifested as a computer product disposed in one or more computer-readable mediums, the product including computer-readable program code.

Computer storage media may be any computer-readable medium used to communicate, disseminate, or transmit a program for use by connecting to an instruction execution system, device, or apparatus. The program code located on the computer storage medium may be disseminated via any suitable medium, including radio, cable, fiber optic cable, RF, etc., or a combination of any of the foregoing.

The computer program code required for the operation of the various sections of the present disclosure may be written in any one or more programming languages. The program code may be run entirely on the user's computer, or as a stand-alone software package on the user's computer, or partly on the user's computer and partly on a remote computer, or entirely on a remote computer or processing device. In the latter case, the remote computer may be connected to the user's computer through any form of network, such as a local region network (LAN) or wide region network (WAN), or connected to an external computer (e.g., via the Internet), or in a cloud computing environment, or used as a service such as software as a service (SaaS).

For each patent, patent application, patent application publication, or other materials cited in the present disclosure, such as articles, books, specifications, publications, documents, etc., the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for safety monitoring of gas facilities in a comprehensive pipeline gallery based on Internet of Things (IoT) implemented by a smart gas device management platform of a system for safety monitoring of gas facilities in the comprehensive pipeline gallery based on the IoT, comprising:

obtaining first monitoring data of a gas cabin and second monitoring data of other cabins from at least one monitoring position combination;

wherein the monitoring position combination includes one or more first monitoring positions in the gas cabin and one or more second monitoring positions in the other cabins, and the at least one monitoring position combination is determined based on a pipeline gallery distribution feature of at least one pipeline gallery sub-region;

determining a joint risk of the one or more first monitoring positions based on the first monitoring data and the second monitoring data, comprising:

determining a unit risk of the gas cabin and at least one unit risk of the other cabins based on the first monitoring data and the second monitoring data;

determining a independent risk based on the unit risk of the gas cabin and the unit risks of the other cabins through a preset algorithm;

constructing a risk map based on the independent risk and a position relationship of the one or more first monitoring positions;

determining the joint risk based on the risk map through a risk determination model;

correcting an output of the risk determination model based on a potential impact degree of the one or more first monitoring positions and determining a corrected joint risk; and determining a maintenance parameter and adjusting at least one monitoring parameter based on the joint risk; and, generating at least one adjustment instruction based on an adjustment amount of the monitoring parameter, determining an adjustment priority of the at least one monitoring parameter based on a data uploading intensity of the gas cabin, and sending the at least one adjustment instruction to the corresponding one or more first monitoring positions based on the adjustment priority sequentially;

wherein the data uploading intensity is determined based on a bandwidth utilization rate of the gas cabin.

2. The method of claim 1, wherein determining the at least one monitoring position combination further includes:

determining the at least one monitoring position combination based on the pipeline gallery distribution feature, a high-risk region distribution, and a critical region distribution, wherein the high-risk region distribution refers to a feature associated with distribution of high-risk regions within the comprehensive pipeline gallery, and the critical region distribution refers to a feature associated with a distribution of regions to be focused on in the comprehensive pipeline gallery.

3. The method of claim 2,
wherein the determining the at least one monitoring position combination based on the pipeline gallery distribution feature, the high-risk region distribution, and the critical region distribution comprises:
generating at least one set of candidate monitoring position set based on the pipeline gallery distribution feature, the high-risk region distribution, and the critical region distribution;
calculating a regional coverage rate of the candidate monitoring position set, wherein the regional coverage rate refers to a ratio of a sum of coverages of all monitoring positions included in the candidate monitoring position set in a certain space;
determining a target monitoring position set based on the regional coverage rate; and determining the at least one monitoring position combination based on the target monitoring position set.

4. The method of claim 3, wherein the determining the target monitoring position set based on the regional coverage rate includes:
calculating a coverage validity distribution of the candidate monitoring position set, wherein the coverage validity distribution refers to a vector or a sequence used to characterize a coverage validity of each monitoring position in the candidate monitoring position set; and
determining the target monitoring position set based on the regional coverage rate and the coverage validity distribution.

5. A system for safety monitoring of gas facilities in a comprehensive pipeline gallery based on Internet of Things (IoT), wherein the system includes a smart gas user platform, a smart gas service platform, a smart gas device management platform, a smart gas sensor network platform, a smart gas object platform;
wherein the smart gas device management platform is configured to: obtain first monitoring data of a gas cabin and second monitoring data of other cabins from at least one monitoring position combination;
wherein the monitoring position combination includes one or more first monitoring positions in the gas cabin and one or more second monitoring positions in the other cabins, and the at least one monitoring position combination is determined based on a pipeline gallery distribution feature of at least one pipeline gallery sub-region;
determine a joint risk of the one or more first monitoring positions based on the first monitoring data and the second monitoring data, comprising:
determining a unit risk of the gas cabin and at least one unit risk of the other cabins based on the first monitoring data and the second monitoring data;
determining a independent risk based on the unit risk of the gas cabin and the unit risks of the other cabins through a preset algorithm;
constructing a risk map based on the independent risk and a position relationship of the one or more first monitoring positions; determining the joint risk based on the risk map through a risk determination model;
correcting an output of the risk determination model based on a potential impact degree of the one or more first monitoring positions and determining a corrected joint risk; and
determine a maintenance parameter and adjusting at least one monitoring parameter based on the joint risk; and
generate at least one adjustment instruction based on an adjustment amount of the monitoring parameter, determine an adjustment priority of the at least one monitoring parameter based on a data uploading intensity of the gas cabin, and based on the adjustment priority send the at least one adjustment instruction to the corresponding one or more first monitoring positions sequentially;
wherein the data uploading intensity is determined based on a bandwidth utilization rate of the gas cabin.

* * * * *